(12) United States Patent
Boss et al.

(10) Patent No.: US 10,694,017 B2
(45) Date of Patent: Jun. 23, 2020

(54) ERGONOMIC POSITION DETECTOR

(71) Applicant: INTERNATIONAL BUSINESS MACHINES CORPORATION, Armonk, NY (US)

(72) Inventors: Gregory J. Boss, Saginaw, MI (US); Michael Bender, Rye Brook, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/008,156

(22) Filed: Jun. 14, 2018

(65) Prior Publication Data

US 2019/0387091 A1  Dec. 19, 2019

(51) Int. Cl.
| | |
|---|---|
| *H04M 1/725* | (2006.01) |
| *G06F 1/16* | (2006.01) |
| *G06F 3/01* | (2006.01) |
| *H04W 52/02* | (2009.01) |
| *G06F 3/0346* | (2013.01) |

(52) U.S. Cl.
CPC ...... *H04M 1/72519* (2013.01); *G06F 1/1694* (2013.01); *G06F 3/017* (2013.01); *H04M 1/72538* (2013.01); *G06F 3/0346* (2013.01); *H04M 2250/12* (2013.01); *H04W 52/0254* (2013.01)

(58) Field of Classification Search
CPC ......... H04M 1/72519; H04M 2250/12; H04M 1/72538; H04M 1/72563; G06F 3/0346; G06F 3/017; G06F 1/1694; G06F 2203/04808; H04W 52/0254

USPC .... 455/550.1, 414.1, 404.1–404.2, 418–420, 455/456.1–457

See application file for complete search history.

(56) References Cited

U.S. PATENT DOCUMENTS

| | | | |
|---|---|---|---|
| 2005/0035955 A1 | 2/2005 | Carter et al. | |
| 2009/0076418 A1* | 3/2009 | Jung | A61B 5/11 600/595 |

(Continued)

FOREIGN PATENT DOCUMENTS

| | | |
|---|---|---|
| CN | 102833410 B | 7/2015 |
| WO | WO2005069111 A1 | 7/2005 |

OTHER PUBLICATIONS

Peter Mell et al, The NIST Definition of Cloud Computing, National Institute of Standards and Technology, Publication 800-145, 2011, entire document.

(Continued)

*Primary Examiner* — Michael Y Mapa
(74) *Attorney, Agent, or Firm* — Patrick J. Daugherty; Daugherty & Del Zoppo Co. LPA

(57) ABSTRACT

Embodiments detect problematic ergonomic positions and movement patterns for a user physically operating a hand-held mobile device as a function of sensory data, via comparing current user ergonomic movement pattern to knowledge base activity movements labeled as problematic ergonomic movements. Thus, in response to determining that a user ergonomic movement pattern matches a labeled hand movements, the embodiments drive communication component of the mobile device to alert the user of engaging the device in a problematic ergonomic movement, and recommend an alternative ergonomic position for use in engaging the device.

18 Claims, 4 Drawing Sheets

(56) References Cited

U.S. PATENT DOCUMENTS

| | | |
|---|---|---|
| 2012/0196630 A1 | 8/2012 | Kawalkar |
| 2015/0070395 A1* | 3/2015 | Kim .................... G06F 1/1694 |
| | | 345/659 |
| 2017/0084070 A1* | 3/2017 | Chamdani ............... G06T 13/40 |
| 2017/0147871 A1 | 5/2017 | Tseng et al. |
| 2018/0005395 A1* | 1/2018 | D'Angelo ............. G06T 1/0007 |
| 2018/0024635 A1* | 1/2018 | Kaifosh .................. G06F 3/017 |
| 2018/0189989 A1* | 7/2018 | Douglas ................ G06T 11/206 |

OTHER PUBLICATIONS

Vasiete et al, Multimodal Frustration Detection on Smartphones, Work-in-Progress, CHI 2015, Crossings, Seoul, Korea, http://dx.doi.org/10.1145/2702613.2732867, entire document.

A. Pawloski, How to prevent smartphone use from causing hand pain, Today, 2015, entire document.

Maryann Berry, Cell Phone Ergononics: How to Avoid the "Smart Phone Slump", 2018, entire document.

Marian Theiss et al, Predicting Grasps with a Wearable Inertial and EMG Sensing Unit for Low-Power Detection of In-Hand Objects, 2016, entire document.

Rappy McRapperson, You're Holding It Wrong: Here's How to Hold Your Touch Screen Gadgets Correctly, 2018, entire document.

Josh Clark, How We Hold Our Gadgets, Mobile/Multidevice, 2015, entire document.

\* cited by examiner

ERGONOMIC POSITION DETECTOR

BACKGROUND

Smart phones and other portable programmable devices enable people to engage and use a wide variety of data processing programs and services in a small, portable and convenient form-factor relative to the larger areas and spaces required by office workstation, laptop computers and other conventional programmable devices providing user interfaces. Besides making phone calls, smartphones provide directions through GPS, take pictures, play music and keep track of appointments and contacts, enable multiple ways of communicating (call, text instant message (IM), email, immediate photo sharing, video calling, video conferencing), keep users actively connected to the internet, enabling constant connection to social networking services. Through miniaturized hardware that packs a processor, speakers, a camera, a GPS receiver, a Wi-Fi adapter and a high definition touch-sensitive screen into a cell-phone-sized device, a smartphone provides virtually all of the functionality of larger desk-top devices.

SUMMARY

In one aspect of the present invention, a computerized method for a problematic ergonomic position detector includes executing steps on a computer processor. Thus, computer processors are configured to determine a current ergonomic movement pattern for a user while the user physically operates a hand-held mobile device as a function of sensory data provided by a sensing component of the mobile device, the determined ergonomic pattern of movement includes data representing a pattern of the user hand movements while engaging the mobile device. The processors are configured to compare the current user ergonomic movement pattern to a knowledge base plurality of activity hand movements that are each labeled as problematic ergonomic movements; and, in response to determining that the compared current user ergonomic movement pattern matches one of the labeled hand movements within a threshold similarity value, drive a communication component of the mobile device to alert the user of engaging the mobile device in a problematic ergonomic movement and recommend an alternative ergonomic position for use in engaging the mobile device.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine a current ergonomic movement pattern for a user while the user physically operates a hand-held mobile device as a function of sensory data provided by a sensing component of the mobile device, wherein the determined ergonomic pattern of movement includes data representing a pattern of the user hand movements while engaging the mobile device. The processor is configured to compare the current user ergonomic movement pattern to a knowledge base plurality of activity hand movements that are each labeled as problematic ergonomic movements; and, in response to determining that the compared current user ergonomic movement pattern matches one of the labeled hand movements within a threshold similarity value, drive a communication component of the mobile device to alert the user of engaging the mobile device in a problematic ergonomic movement and recommend an alternative ergonomic position for use in engaging the mobile device.

In another aspect, a computer program product for a problematic ergonomic position detector has a computer-readable storage medium with computer readable program code embodied therewith. The computer readable hardware medium is not a transitory signal per se. The computer readable program code includes instructions for execution which cause the processor to determine a current ergonomic movement pattern for a user while the user physically operates a hand-held mobile device as a function of sensory data provided by a sensing component of the mobile device, the determined ergonomic pattern of movement includes data representing a pattern of the user hand movements while engaging the mobile device. The processor is further caused to compare the current user ergonomic movement pattern to a knowledge base plurality of activity hand movements that are each labeled as problematic ergonomic movements; and, in response to determining that the compared current user ergonomic movement pattern matches one of the labeled hand movements within a threshold similarity value, to drive a communication component of the mobile device to alert the user of engaging the mobile device in a problematic ergonomic movement and recommend an alternative ergonomic position for use in engaging the mobile device.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
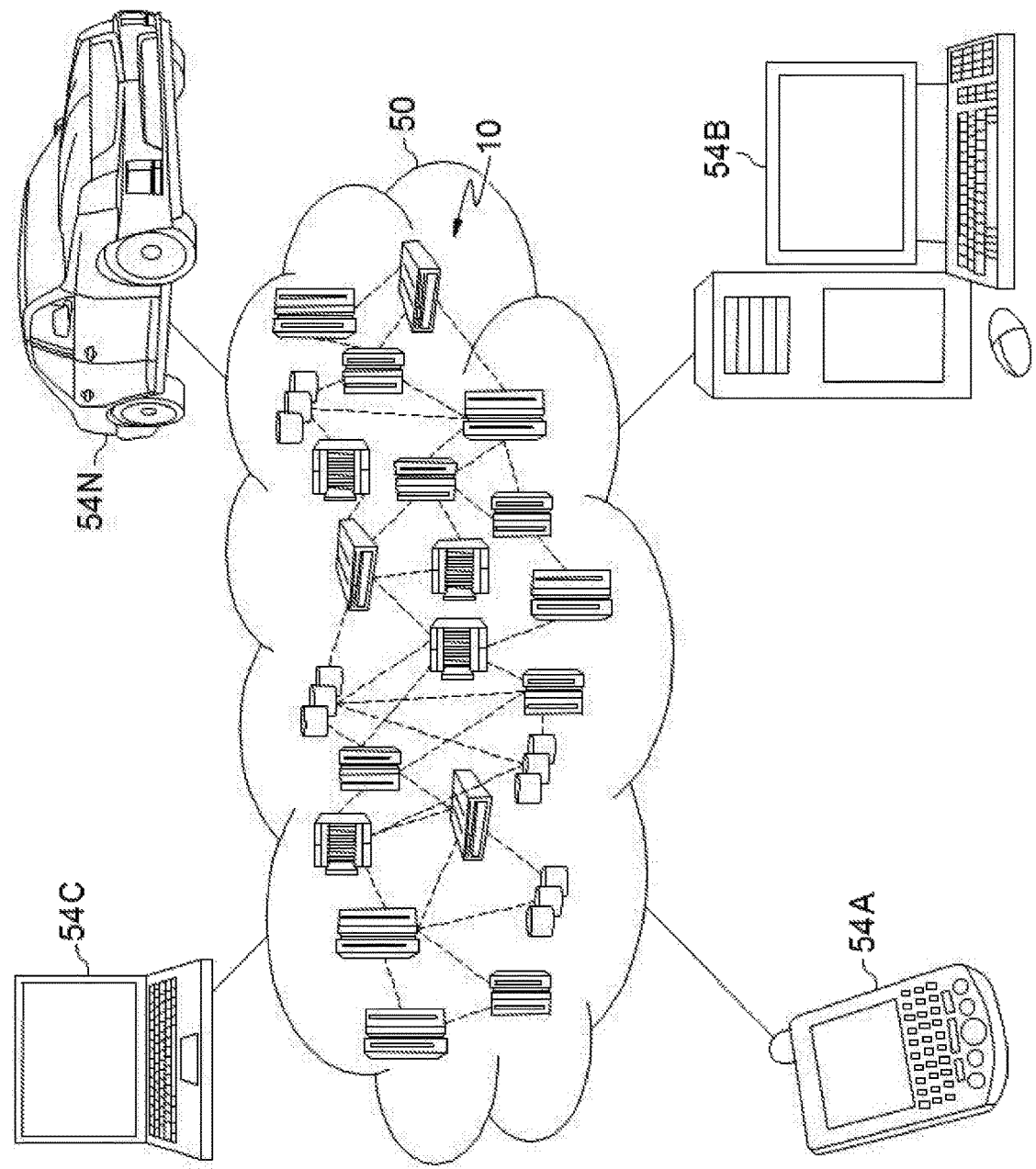
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
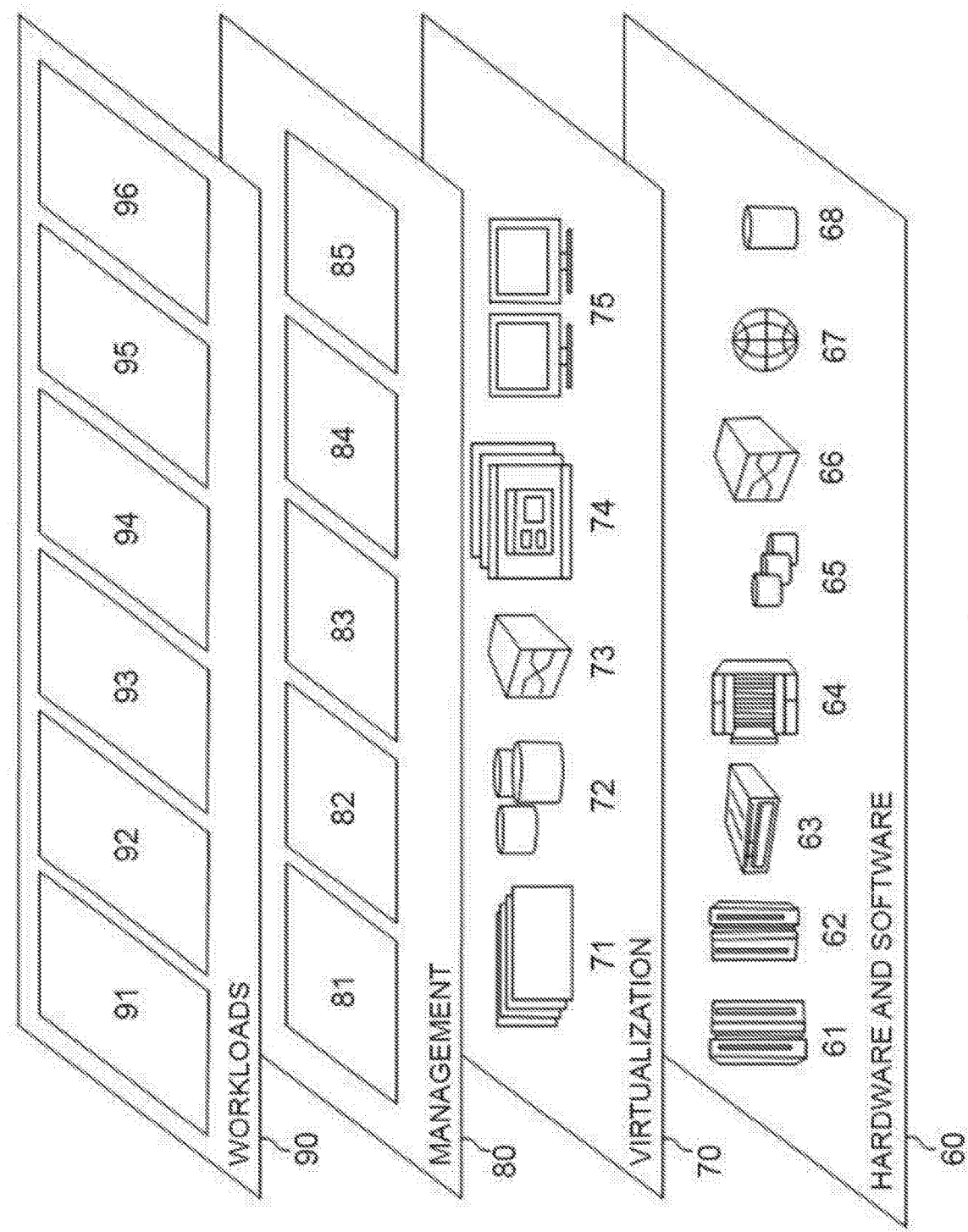
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a problematic ergonomic position detector according to embodiments of the present invention 96.

Figure 3:
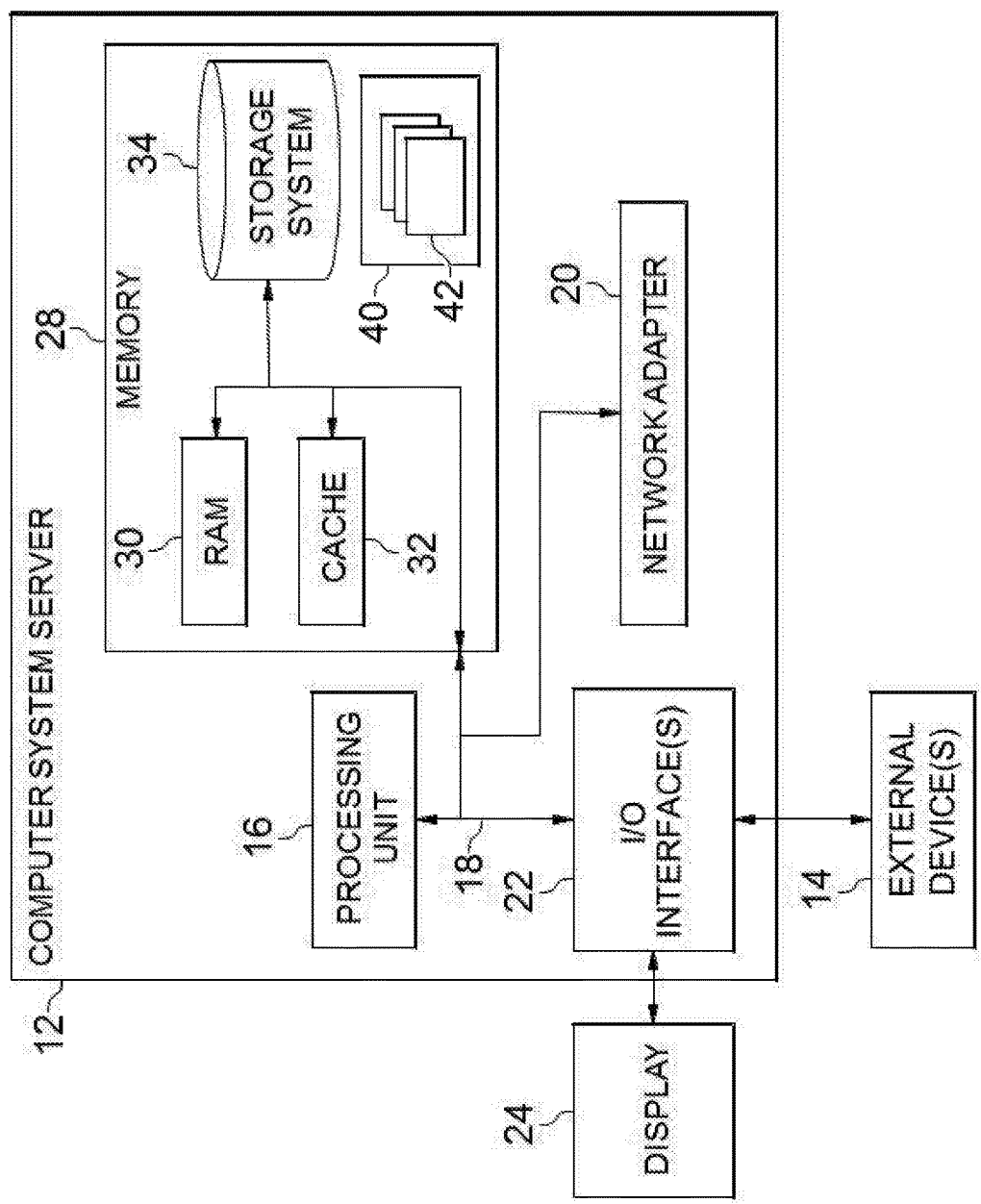
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Smart phones and other portable programmable devices free users from being tethered to office workspaces, workstation, laptop computer, etc., enabling users to utilize a wide variety of data processing programs and services from a small, convenient form. However, conforming to the restricted ergonomic hand and body positioning available to a user to engage the graphical user interface (GUI) keyboard, microphone and other input components of the mobile devices may result in pain, injury or discomfort due to poor ergonomic positioning utilized by the user. Over short time frames such poor ergonomic positioning may have little or no effect, as the user can reposition into a better alignment after engaging the device to relieve any stresses caused by the poor ergonomic positioning before injury or pain results. But over longer time frames, or during periods of increased motion frequencies, such as from using a keyboard to rapidly enter a lot of text, or engaging in a long audio conversation, poor ergonomic positioning may result in injury or pain experienced within user hands, wrists, arms, spines, etc. In some cases, the injury occurs before the users realize they are using poor form and takes corrective action. For example, the repetitive motions that cause Carpal Tunnel syndrome injuries may not cause discomfort to the user while they are being executed, and by the time the user realizes they are exposing themselves to injury from such motions and stops to rest or to realign body positioning to reduce forearm and wrist stress, etc., damage and injury has already occurred in wrist and arm muscles and tendons or other structures.

Figure 4:
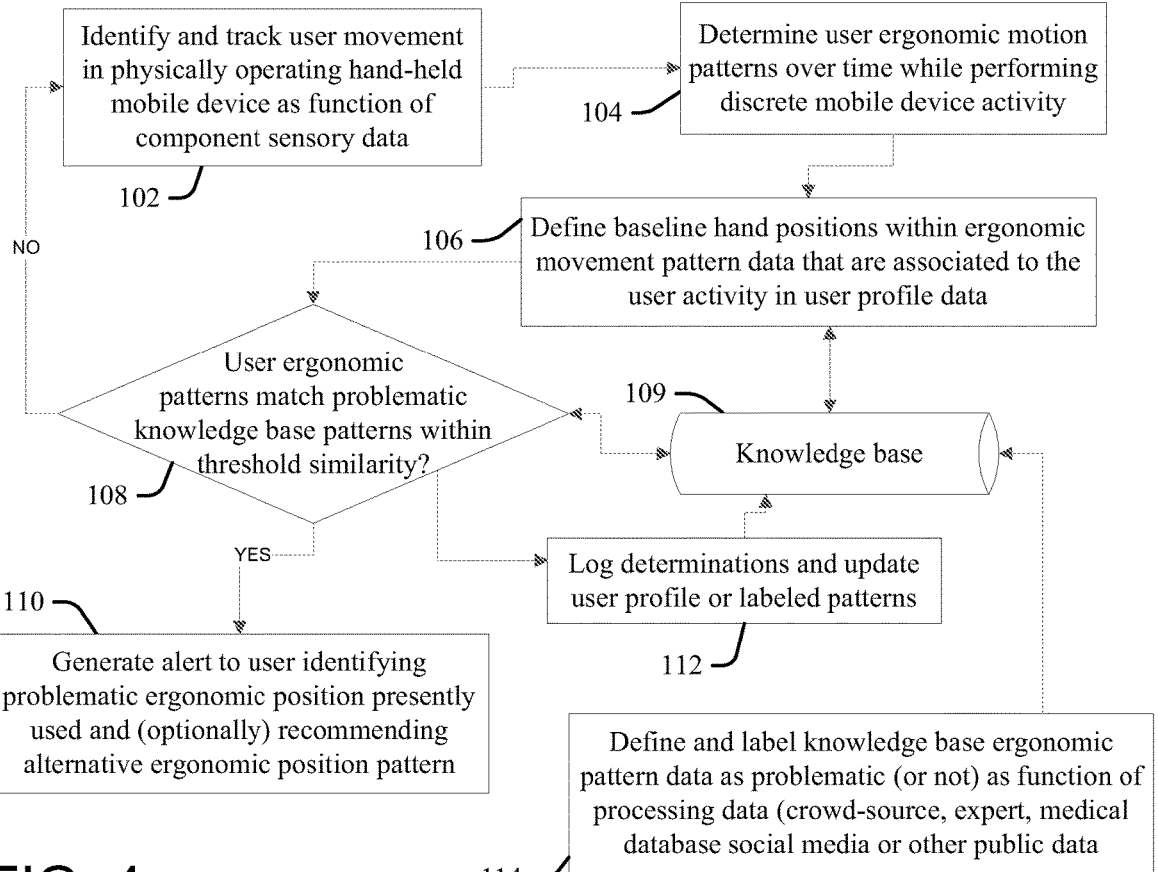
FIG. 4 is a flow chart illustration of an embodiment of the present invention.

FIG. 4 illustrates a problematic ergonomic position detector according to embodiments of the present invention that identifies when a user of a smart phone or other mobile device is using a poor hand position while entering text into a keypad component, speaking into a microphone, or otherwise using the device. At 102 a processor (for example, a central processing unit (CPU)) executes code (such as code installed on a storage device in communication with the processor) and is thereby configured according to the present invention (a "configured processor") to identify and track user hand and other body movements in physically operating a hand-held mobile device (a smart phone, tablet, personal digital assistant, etc.), and thereby an ergonomic pattern of movement of the user while the user physically operates the hand-held mobile device, as a function of sensory data acquired by sensing component of the device. Illustrative but not limiting or exhaustive examples of the sensory data and components include image data acquired by image data acquisition (camera) components of the device, motion data acquired by motion detection components (accelerometers, gyroscopic elements, tilt detectors, etc.) and spatial location data acquired by spatial locators (altimeters, compass and distance locator components, etc.).

Thus, embodiments of the configured processor may determine at 102 mobile device orientation with respect to the user (as a function of image, accelerometer, altimeter, compass, etc. data). For example, the configured processor may determine which fingers or other parts of a user hand are entering text characters into an application running on the mobile device via a keypad input component device or gripping the device, and at what angle or tilt perspective to the phone, as a function of locating the hand relative to the phones in three-dimensional space (with respect to X, Y and Z axis coordinates), distance from the ground as function of altimeter data, as reflected in image data acquired from camera data; which fingers are engaging the device and at what locations at any time in response to fingerprint inputs from fingerprint reader components, or pressure data from fingertip engagement of touch and pressure-sensitive components deployed within GUI screens and body elements, or by identifying the location of specific keypad icon pressed to enter text data by the user, thereby determining which specific thumb or fingers is (likely) being used to provide text and other inputs, and a rate of entry of text characters into an application running on the mobile device via the keypad input component device.

At 104 the configured processor uses the data acquired at 102 to determine user ergonomic motion patterns (habits) of motions and engagement over periods of time (as a function of time): the positions of a user hand, face, wrist or other body portion relative to the mobile device keyboard, microphone, camera, etc., while a discrete mobile device activity is being performed by the user, such as entry of a word, dictation of a word, etc. The configured processor may use image data from front-facing or back-facing cameras of the device, or the motion or location data, to determine an orientation of the body of the device relative to a user face, hand, wrist, specific fingers, shoulder and spine, etc., during the generation of such pattern data, to thereby determine patterns of user body positions over time that are classifiable as repeated and recognized motions associated to specific input actions (for example, entering text into a keypad, speaking into a microphone, reading a display screen, taking a picture, etc.)

At 106 the configured processor defines (establishes recognizes) baseline, known hand positions within the determined ergonomic movement pattern data that are associated to the activity of the user (keypad entry, talking on the phone, etc.) currently being executed by the user within a user profile (for example, database entry) stored in or accessed via a knowledge base 109 (memory device, referential database pointer, cloud resource, etc.) as personal activity hand positions of the user in carrying out the associated activity.

At 108 the configured processor compares the personal activity hand positions of the user (the user ergonomic patterns) to a knowledge base 109 of activity hand movements and positions that are labeled or flagged as either associated with bad (problematic) ergonomic positions, or non-problematic (for example, as good or neutral positions), to determine whether the user current hand positioning patterns match patterns labeled within the knowledge base data 109 as problematic (that differences (deltas) determined between the respective patterns at 112 are small enough to meet a threshold similarity value).

In response to determining at 108 that a current hand positioning of the user matches a pattern labeled within the knowledge base data 109 as problematic (that the difference determined between the respective patterns at meets a threshold similarity value), at 110 the configured processor generates an alert to the user that identifies the problematic ergonomic position that they are presently using to engage the mobile device (for example, "Your current wrist angle may cause repetitive motion injury when used to enter text data on a keypad"), and optionally recommends an alternative, better, safer, crowd-source or expert-based best-practices ergonomic position for use (for example, ""Stop typing and flex your wrists for 30 seconds before resuming typing", or "Straighten your wrists for the next 2 minutes (until notified by your phone)", etc.). Some embodiments generate and provide recommendations to the user at 110 that are determined from, or convey, treatments, motions and other physical routines that are identified within expert knowledge bases as known or likely to alleviate injury, discomfort or pain arising from problematic hand positions.

In response to determining at 108 that ergonomic patterns from current hand positioning of the user do not match patterns labeled within the knowledge base data 109 as problematic within the threshold similarity value, the configured processor returns to monitoring user activity at 102.

In some embodiments matching the patterns at 108 is also dependent upon matching determined user activities: for example, the movement pattern associated to inputting text via a keypad can only match movement patterns labeled as keypad input activities.

At 112 the configured processor logs determinations made at 108 to the knowledge base 109. Thus, aspects update or revise the knowledge base 109 at 114 in a learning or feedback process in response to the determination at 108, refining or learning additional associations, probabilities, likelihoods, weights, ranks or other values with respect to the current user activity and the matching knowledge base pattern.

In some embodiments a processor configured according to the present invention at 114 defines and labels the knowledge base ergonomic pattern data 109, determining and flagging knowledge base hand positions as problematic (or not) ergonomic positions as function of processing public data (crowdsource, expert and medical database data, social media data or other data, etc.). Such aspects define, refine, revise, learn or create baseline common practices and techniques used successfully by a population base of a plurality of different people, as a function of expert assessments, general public self-reported labeling of positions as good or bad (for example, "holding my phone between my cheek and shoulder for more than a minute gives me neck pain"), or of knowledge base positions associated or contained within with larger activity patterns that are labeled as good or bad. For example, in response to determining that a motion pattern was performed in executing a designated activity before and within a threshold time proximity prior to a user experiencing wrist pain, the configured processor may label as a "bad" or "problematic" movement pattern or position for that activity. Thus, at 114 a processor configured according to the present invention defines the knowledge base data 109 by collecting and classifying both positive and negative hand position usage of various (numerous) users, and in some embodiments further classified as to user-reported or determined activities.

Embodiments of the present invention provide corrective recommendations to the user when a poor position is identified during mobile device usage. In some embodiments a reporting module is generated by the configured processor that is triggered by determining the occurrence of pain-inducing actions within acquired user motion and ergonomic position data. By identifying pain-causing user behavior the embodiments are enabled to alert the user of poor hand position, as well as to preemptively provide notification to the user to prevent the development of pain that would otherwise occur if the user does not alter motion or ergonomic positions. Embodiments provide a corrective action based on previously identified correct behavior from the user regarding correct hand position, as well as from expert and crowd-sourced knowledge bases. Knowledge base information is used to automatically augment recommendations to the user with suggestions from crowd-sourced hand positioning corpus (built within the knowledge base 109 at 114). An iterative feedback loop process at 114 helps the user to understand what recommended changes in ergonomic position works effectively for the user, as well as what recommendations do not work well, and wherein the configured processor learns the best or more preferred solutions from user feedback, updating the corpus of data within the knowledge base 109 with both positive and negative feedback from the user, the crowd-sourced community, and experts.

Figure 5:
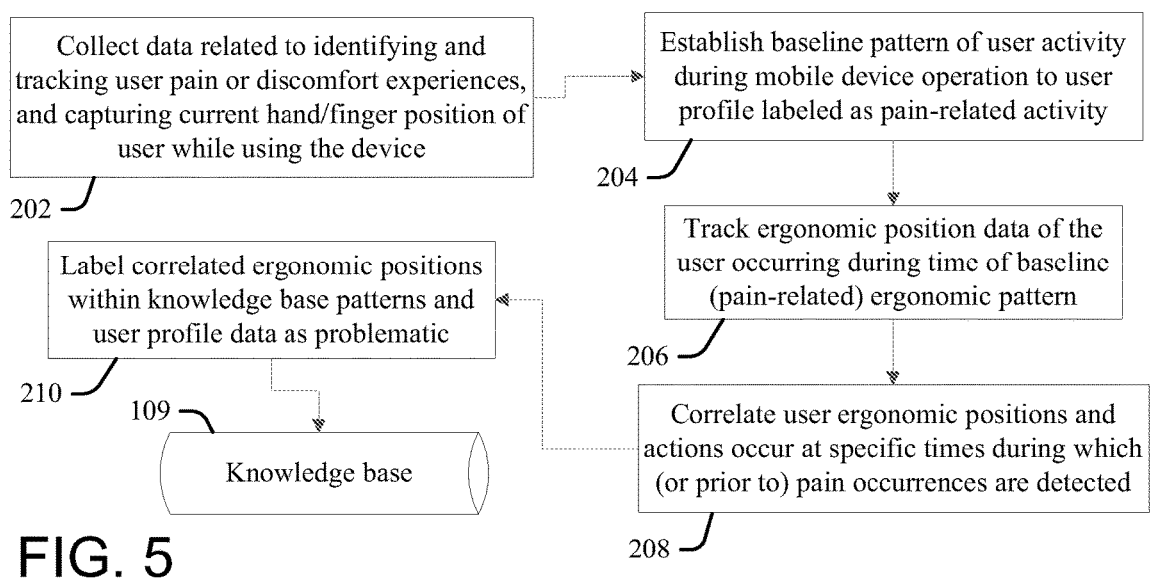
FIG. 5 is a flow chart illustration of another embodiment of the present invention.

FIG. 5 illustrates another embodiment of the present invention that identifies or determine an occurrence or experience of pain or discomfort in a user's hand, wrist or other body area that is associated with problematic ergonomic positioning during operation of a mobile device, via capturing ergonomic positioning of the user while using a mobile device. At 202 a processor (for example, a central processing unit (CPU)) executes code (such as code installed on a storage device in communication with the processor) and is thereby configured according to the present invention (a "configured processor") to collect data points related to identifying and tracking user pain or discomfort experiences, and including capturing hand and finger position of the user while using the device (for example, via camera, keyboard cadence over time, audio and gesture data, or other inputs considered in the embodiment of FIG. 4 described above).

Illustrative but not limiting or exhaustive examples determinations at 202 that are relevant to user pain or discomfort or problematic ergonomic positioning, alone or in combination with other determinations, include determining a reduction in a normal typing speed, a slowing modification within a normal standard deviation of a user's typical delays within keystrokes, of a baseline speed and cadence of a user's typing) that is associated (contemporary in time; occurrence of a specific facial expression of the user within image data acquired by analyzing image data captured by a user-facing lens) that matches an expression of pain, discomfort, emotion or other sentiment within the knowledge base 109; physical gestures, such as shaking the hands in a pattern (frequency of shaking and duration, range of hand motion, etc.) that is historically used to relieve pain after typing, within a proximity in time to typing motions; verbal pain indicators determined within audio data acquired by the mobile device microphone, for example, the user might verbally state "Ouch, that hurts" after typing continuously with incorrect (bad) hand positioning on the device; sensitivity and pressure data acquired during device usage that indicates changes in pressure matching patterns labeled with pain indicator motions; and still others will be apparent to one skilled in the art.

At 204 the configured processor establishes a baseline pattern of user activity to user profile data that is labeled as pain-related activity. More particularly, the configured processor determines relationships of the different values of motion, image, sound, pressure, etc. data collected during a time period for which the user is determined to be experiencing pain, and labels the associated ergonomic positions during the mobile device operation as pain-related (discomfort, problematic, etc.).

At 206 the configured processor tracks ergonomic position data of the user occurring during period of time spanning pain baseline ergonomic pattern data, and at 208 correlates hand and other ergonomic positions and actions (movements) of the user determined to occur at specific times during which (or prior to) pain occurrences are detected, and at 210 responsively labels the hand-related actions and other ergonomic positions correlated at 208 within the user profile data and within general ergonomic pattern data (used for matching at 108, FIG. 4) as problematic ergonomic positions.

The relatively small footprint of the graphical user interface (GUI) keyboard, or the location or audio signal acquisition capacities of an audio microphone other input component of smart phones and other mobile devices, relative to the larger areas and spaces provided by an office workstation, a laptop computer, etc., limits the range of physical motions or positions available to the user to engage and provide data inputs to the mobile device input components. Over time these limitations may result in pain, injury (for example, via Carpal Tunnel syndrome) or discomfort within user hands, wrists, arms, spines, etc., due to inefficient or ergonomically incorrect handling or poor body positioning of the user while entering text or speaking into a microphone or otherwise engaging the smart phone or other mobile device. The prior art does not teach methods or devices for detecting if a human user is misusing a mobile device or handling it with poor ergonomic positioning in real-time, while the user is in said poor ergonomic positioning. The prior art thereby fails to alert the user to take corrective measures on a timely basis, before pain, discomfort or injury arise from the poor ergonomic positioning).

In contrast, through image recognition and data analysis embodiments of the present invention dynamically identify if a user is holding their smart phone (or other mobile device) in such a way that would contribute to pain or discomfort due to bad position, and thereby alert the users to change their positioning into good or safe ergonomic positioning during their use of the devices, before the poor ergonomic positioning results in pain, discomfort or injury. The embodiments identify when a user is typing using a poor hand position while using a mobile device, including in response to identifying the (likely) occurrence of user hand pain by capturing hand and finger position of the user while using the device via camera, keyboard cadence over time, audio, gesture and data inputs, and provide a user-appropriate correction recommendation to the user when poor position is identified during mobile device usage.

Embodiments provide advantages over the prior art and direct benefits in identifying data indicative of poor ergonomic positioning, and generating recommendations for abatement in association with the identified poor ergonomic positioning, that may be used by mobile device manufacturers and operating system (OS) service providers and managing entities to ensure that users are operating the devices safely. User satisfaction is enhanced, and use of the mobile devices encouraged, by reducing injury and pain risk and generally improving the medical health of end users that timely receive corrective position recommendations.

The dynamic, interactive and real-time nature of the process executed by embodiment of the present invention enable a user to spot poor ergonomic positions as they occur, including those that have not yet been recognized within the prior art expert databases as problematic. By associating ergonomic positions with pain occurrences observed in user mobile device interaction data the embodiments learn and label new problematic ergonomic positions relative to the user that are not otherwise recognized in the expert, crowd-sourced or prior art databases, and are thereby enabling to notify the user when they occur again, pro-actively and prior to the user developing pain from their continued use, wherein the user can change into better and safer ergonomic positions.

Embodiments of the present invention also generate and display to users (for example, via image and video presentations on graphical user interface displays, audio information conveyed on audio speakers, etc.) dynamic suggestions and solutions that are tailored to an individual user profile, and provided on a timely basis, interactively recommending behavioral changes to the user for their hand position. Different types of grips and holding patterns and usage by a particular user and presented as labeled as good or bad ergonomic positions may be built into a dynamic, rule-based baseline ergonomic position modeling system that generates recommendations tailored to each user. Such displays to users may encompass interactive mechanisms, wherein in response to recommendation videos, etc., a user may post queries or questions (for example, asking for recommended time periods to hold suggested poses or execute recommended relaxation or stretching routines, or alternative perspective views of suggested hand positions), wherein the embodiment utilize automate chat bots to respond to each user query with best-matching answers on an on-going, conversational basis, and/or directly route to the user to a service provider for answers or further responses. Recommendations displayed or otherwise provided to users by embodiments may also include statistics of success rates of a particular treatment recommendations or other explanatory or supporting information useful in establishing or explaining the advantages to the user of responding to alerts from the embodiment and/or adopting recommended abatement measures presented to the user.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising executing on a computer processor:

determining, as a function of sensory data provided by a sensing component of a hand held mobile computing device, identification of fingers of a user hand that are engaging a keypad input component of a touch screen of the hand-held mobile computing device to enter text characters into an application running on the mobile device, an orientation of the user hand relative to the hand-held mobile computing device, and a rate of entry of the text characters into the application by the fingers via the keypad input component;

determining a current ergonomic movement pattern for the user while the user physically operates the hand-held mobile computing device as a function of the identification of the fingers, the orientation of the user hand relative to the hand-held mobile computing device and the rate of entry of the text characters into the application by the fingers via the keypad input component, wherein the determined ergonomic pattern of movement includes data representing a pattern of the user hand movements with an orientation of a body of the hand-held mobile computing device with respect to the user while physically operating the hand-held mobile computing device in a discrete user activity of a plurality of discrete user activities that operate the hand-held mobile computing device, wherein physically operating the hand-held mobile computing device in the discrete activity comprises at least one discrete user activity with associated processing activity of the hand-held mobile computing device selected from a group consisting of: entering text via the keypad input component with the touch screen of the hand-held mobile computing device, speaking into a microphone disposed within the hand-held mobile computing device, reading a displayed screen displayed on the hand-held mobile computing device, and taking a picture with a camera disposed within the hand-held mobile computing device;

comparing the current user ergonomic movement pattern to a knowledge base of a plurality of activity hand movements that are each labeled as problematic ergonomic movements and labeled with the associated processing activity of the discrete user activity operating the hand-held mobile computing device; and in response to determining that the compared current user ergonomic movement pattern for the discrete user activity matches one of the labeled hand movements within a threshold similarity value, driving a communication component of the mobile device to alert the user physically operating the hand-held mobile computing device in a problematic ergonomic movement and recommend during the discrete activity an alternative ergonomic position for use in physically operating the hand-held mobile computing device for the discrete user activity.

2. The method of claim 1, wherein the hand-held mobile computing device that is physically operated comprises at least one selected from a group consisting of: a smartphone, a tablet, and a personal digital assistant; and wherein the alternative ergonomic position for use in physically operating the hand-held mobile device comprises a change in grip of the body of the hand-held mobile computing device for the discrete activity.

3. The method of claim 1, wherein the data includes an indicator of discomfort of the user, and wherein the determining that the compared current user ergonomic movement pattern matches the one of the labeled knowledge base plurality of activity hand movements within the threshold similarity value is further dependent on determining that the current ergonomic movement pattern for the user while the user physically operates the hand-held mobile computing device is associated with the indicator of the discomfort of the user determined while physically operating the hand-held mobile computing device from sensory data during the discrete user activity generated by a non-body worn sensory component disposed within the hand-held mobile computing device.

4. The method of claim 3, wherein the determining that the current ergonomic movement pattern for the user physically operating the hand-held mobile computing device during the discrete activity is associated with the discomfort of the user according to the indicator of the discomfort of the user is selected from the group consisting of:

determining that the rate of entry of the text characters into the application by the fingers via the keypad input component is a reduction in a normal typing speed of the user typing via the keypad input component with the touch screen of the hand-held mobile computing device;

determining an occurrence of a specific facial expression of the user obtained with image data from a camera disposed within the hand-held mobile device while physically operating the hand-held mobile computing device that matches an expression labeled as discomfort within the knowledge base;

determining an utterance by the user with a microphone within the hand-held mobile computing device of a verbal indicator labeled with as a discomfort indicator within the knowledge base; and determining a change in pressure data on the hand-held mobile computing device acquired during physical operation of the hand-held mobile computing device that matches a pattern of change in pressure labeled as a discomfort indicator within the knowledge base.

5. The method of claim 1, wherein the knowledge base movements labeled as problematic ergonomic movements are each labeled with the discrete user activity that physically operates the hand-held mobile computing device, the method further comprising:

determining an association of the current user ergonomic movement pattern to a current hand-held mobile computing device processing discrete activity of the user; and wherein the determining that the compared current user ergonomic movement pattern matches the one of the labeled knowledge base plurality of activity hand movements within the threshold similarity value is a function of matching the current hand-held mobile computing device processing activity of the user to the labeled user activity matching one of the knowledge base movements labeled as a problematic ergonomic movement physically operating the hand-held mobile computing device.

6. The method of claim 5, wherein the current processing activity of the user physically operating the hand-held mobile computing device and associated with the current ergonomic pattern movement is selected from the group consisting of: text string data entry via the keypad input component with the touch screen of the hand-held mobile computing device, conducting a telephone call via a telephone component of the hand-held mobile computing device, and viewing image data on a display screen of the hand-held mobile computing device.

7. The method of claim 1, wherein the sensory data provided by the sensing component disposed within the hand-held mobile computing device comprises image data acquired by a camera disposed within the hand-held mobile computing device.

8. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the determining the identification of fingers engaging the keypad input component to enter the text characters into the application running on the mobile device and the orientation of the user hand relative to the hand-held mobile computing device and the rate of entry of the text characters into the application by the fingers via the keypad input component, the determining the current ergonomic movement pattern for the user while the user physically operates the hand-held mobile computing device, the comparing the current user ergonomic movement pattern to the knowledge base plurality of labeled activity hand movements with associated processing activity, and driving the communication component device to alert the user and recommend the alternative ergonomic position in response to determining that the compared current user ergonomic movement pattern matches the one of the labeled hand movements within the threshold similarity value.

9. The method of claim 8, wherein the computer-readable program code is provided as a service in a cloud environment.

10. A system, comprising: a processor;
a computer readable memory in circuit communication with the processor; and
a computer readable storage medium in circuit communication with the processor;
wherein the processor executes program instructions stored on the computer-readable storage medium via the computer readable memory and thereby:
determines, as a function of sensory data provided by a sensing component of a hand held mobile computing device, identification of fingers of a user hand that are engaging a keypad input component of a touch screen of the hand-held mobile computing device to enter text characters into an application running on the mobile device, an orientation of the user hand relative to the hand-held mobile computing device, and a rate of entry of the text characters into the application by the fingers via the keypad input component of the touch screen of the hand held mobile computing device;
determines a current ergonomic movement pattern for the user while the user physically operates the hand-held mobile computing device as a function of the identification of the fingers, the orientation of the user hand relative to the hand-held mobile computing device and the rate of entry of the text characters into the application by the fingers via the keypad input component, wherein the determined ergonomic pattern of movement includes data representing a pattern of the user hand movements with an orientation of a body of the hand-held mobile computing device with respect to the user while physically operating the hand-held mobile computing device in a discrete user activity of a plurality of discrete user activities that operate the hand-held mobile computing device, wherein physically operating the hand-held mobile computing device in the discrete activity comprises at least one discrete user activity selected from a group consisting of: entering text via the keypad input component with the touch screen of the hand-held mobile computing device, speaking into a microphone disposed within the hand-held mobile computing device, reading a displayed screen displayed on the hand-held mobile computing device, and taking a picture with a camera disposed within the hand-held mobile computing device;
compares the current user ergonomic movement pattern to a knowledge base of a plurality of activity hand movements that are each labeled as problematic ergonomic movements and labeled with the associated processing activity of the discrete user activity operating the hand-held mobile computing device; and
in response to determining that the compared current user ergonomic movement pattern for the discrete user activity matches one of the labeled hand movements within a threshold similarity value, drives a communication component of the mobile device to alert the user of physically operating the hand-held mobile computing device in a problematic ergonomic movement and recommend during the discrete activity an alternative ergonomic position for use in physically operating the hand-held mobile computing device for the discrete user activity.

11. The system of claim 10, wherein the hand-held mobile computing device that is physically operated comprises at least one selected from a group consisting of: a smartphone, a tablet, and a personal digital assistant; and wherein the alternative ergonomic position for use in physically operating the hand-held mobile device comprises a change in grip of the body of the hand-held mobile computing device for the discrete activity.

12. The system of claim 10, wherein the data includes an indicator of discomfort of the user, and wherein the processor executes the program instructions stored on the computer-readable storage medium via the computer readable memory and thereby determines that the compared current user ergonomic movement pattern matches the one of the labeled knowledge base plurality of activity hand movements within the threshold similarity value upon determining that the current ergonomic movement pattern for the user while the user physically operates the hand-held mobile computing device is associated with the indicator of discomfort of the user determined from sensory data during the discrete user activity generated by a non-body worn sensory component disposed within the hand-held mobile computing device.

13. The system of claim 12, wherein the processor executes the program instructions stored on the computer-readable storage medium via the computer readable memory and thereby determines that the current ergonomic movement pattern for the user is associated with the discomfort of the user according to the indicator of the discomfort of the user that is selected from the group consisting of:
determining that the rate of entry of the text characters into the application by the fingers via the keypad input component is a reduction in a normal typing speed of the user typing via the keypad input component with the touch screen of the hand-held mobile computing device;
determining an occurrence of a specific facial expression of the user obtained with image data from a camera disposed within the hand-held mobile computing device while physically operating the hand-held mobile computing device that matches an expression labeled as a discomfort indicator within the knowledge base;
determining an utterance by the user with a microphone within the hand-held mobile computing device of a verbal indicator labeled with as a discomfort indicator within the knowledge base; and
determining a change in pressure data on the hand-held mobile computing device acquired during physical operation of the hand-held mobile computing device that matches a pattern of change in pressure labeled as a discomfort indicator within the knowledge base.

14. The system of claim 10, wherein the knowledge base movements labeled as problematic ergonomic movements are each labeled with the discrete user activity that physically operates the hand-held mobile computing device, and wherein the processor executes the program instructions stored on the computer-readable storage medium via the computer readable memory and thereby:
determines an association of the current user ergonomic movement pattern to a current hand-held mobile computing device processing activity of the user; and determines that the compared current user ergonomic movement pattern matches the one of the labeled knowledge base plurality of activity hand movements within the threshold similarity value as a function of matching the current hand-held mobile computing device processing activity of the user to the labeled user activity matching one of the knowledge base movements labeled as a problematic ergonomic movement physically operating the hand-held mobile computing device.

15. A computer program product for a thought classifier, the computer program product comprising:

a computer readable storage medium having computer readable program code embodied therewith, the computer readable program code comprising instructions for execution by a processor that cause the processor to:

determine, as a function of sensory data provided by a sensing component of a handheld mobile computing device, identification of fingers of a user hand that are engaging a keypad input component of a touch screen of the hand-held mobile computing device to enter text characters into an application running on the mobile device, an orientation of the user hand relative to the hand-held mobile computing device, and a rate of entry of the text characters into the application by the fingers via the keypad input component;

determine a current ergonomic movement pattern for the user while the user physically operates the hand-held mobile computing device as a function of the identification of the fingers, the orientation of the user hand relative to the hand-held mobile computing device and the rate of entry of the text characters into the application by the fingers via the keypad input component, wherein the determined ergonomic pattern of movement includes data representing a pattern of the user hand movements with an orientation of a body of the hand-held mobile computing device with respect to the user while physically operating the hand-held mobile computing device in a discrete user activity of a plurality of discrete user activities that operate the hand-held mobile computing device, wherein physically operating the hand-held mobile computing device in the discrete activity comprises at least one discrete user activity selected from a group consisting of: entering text via the keypad input component with the touch screen of the hand-held mobile computing device, speaking into a microphone disposed within the hand-held mobile computing device, reading a displayed screen displayed on the hand-held mobile computing device, and taking a picture with a camera disposed within the hand-held mobile computing device;

compare the current user ergonomic movement pattern to a knowledge base of a plurality of activity hand movements that are each labeled as problematic ergonomic movements and labeled with the associated processing activity of the discrete user activity operating the hand-held mobile computing device; and in response to determining that the compared current user ergonomic movement pattern for the discrete user activity matches one of the labeled hand movements within a threshold similarity value, drive a communication component of the mobile device to alert the user of engaging the hand-held mobile computing device in a problematic ergonomic movement and recommend during the discrete activity an alternative ergonomic position for use in physically operating the hand-held mobile computing device for the discrete user activity.

16. The computer program product of claim 15, wherein the hand-held mobile computing device that is physically operated comprises at least one selected from a group consisting of: a smartphone, a tablet, and a personal digital assistant; and wherein the alternative ergonomic position for use in physically operating the hand-held mobile device comprises a change in grip of the body of the hand-held mobile computing device for the discrete activity.

17. The computer program product of claim 15, wherein the data includes an indicator of discomfort of the user, and wherein the computer readable program code instructions for execution by the processor further cause the processor to determine that the compared current user ergonomic movement pattern matches the one of the labeled knowledge base plurality of activity hand movements within the threshold similarity value upon determining that the current ergonomic movement pattern for the user while the user physically operates the hand-held mobile computing device is associated with the indicator of the discomfort of the user determined while physically operating the hand-held mobile device from sensory data during the discrete user activity generated by a non-body worn sensory component disposed within the hand-held mobile computing device.

18. The computer program product of claim 15, wherein the sensory data provided by the sensing component disposed within the hand-held mobile computing device which excludes body worn sensors comprises image data acquired by a camera disposed within the hand-held mobile computing device.

* * * * *